July 23, 1935.    M. J. DRACHMAN    2,008,754
ELECTROMEDICAL INSTRUMENT
Filed Feb. 20, 1934
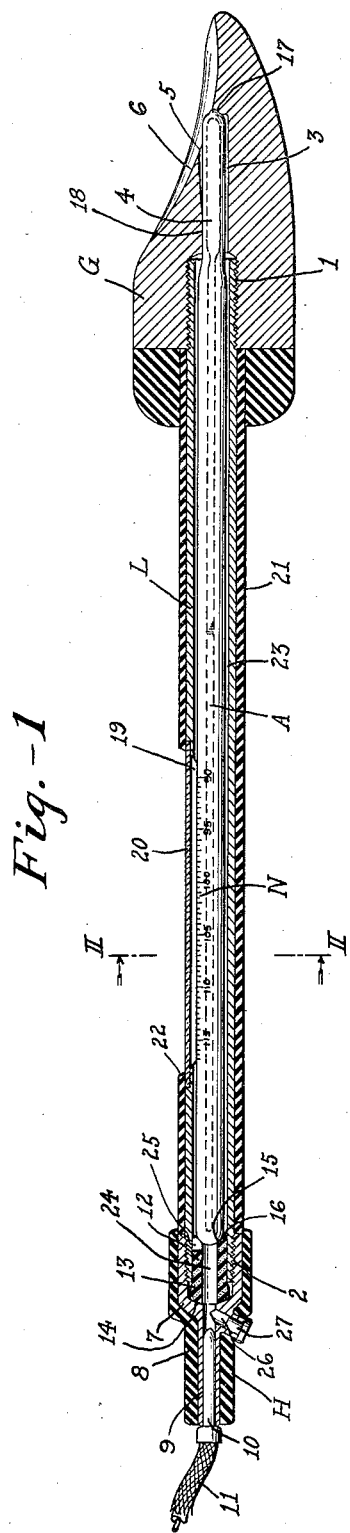
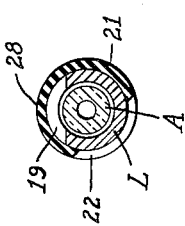
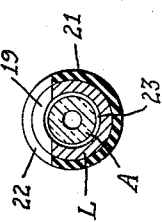
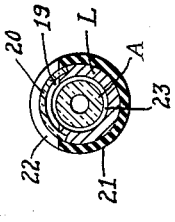
INVENTOR
Myron J. Drachman
BY
ATTORNEY Patented July 23, 1935

2,008,754

UNITED STATES PATENT OFFICE 2,008,754

ELECTROMEDICAL INSTRUMENT

Myron J. Drachman, New York, N. Y.

Application February 20, 1934, Serial No. 712,223

5 Claims. (Cl. 174—89)

This invention relates to an electromedical instrument adapted for various purposes, as for instance the treatment of internal organs and tissues.

While the invention may be embodied in various forms the drawing herewith illustrates it in the form of an instrument for electrical and medical treatment, the instrument illustrated being known as a thermophore adapted for vaginal and rectal treatments.

An object of the invention is to provide an instrument of the type indicated including a thermometer and the instrument being constructed to contain and fully protect and keep clean the thermometer while at the same time holding the thermometer in a position where it can be conveniently read at any time.

A further object is to so construct the instrument that it may, upon occasion, be utilized for the injection of liquids, for instance medicated liquids, through the device to the points within the body of the patient where the liquids are desired, as for instance for drainage purposes or for the application of medicants to affected tissues.

A further object is to so construct the device as to enable ready removal of the thermometer, or insertion of the thermometer, as for cleaning purposes etc. at all times.

A further object is to so construct the device that the thermometer will be held against movement and damage within the device.

A further object is to so construct the device that an electric conductor may be readily connected to and disconnected therefrom and whereby to provide an appropriate path of conductivity lengthwise of the instrument from the point of attachment of said conductor at one end, to the electrode where the current is to be utilized at the opposite end.

A further object is to provide a liquid passageway lengthwise through the device and to provide for the attachment of a liquid conduit to the device when desired.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a longitudinal sectional view through an instrument constructed in accordance with the provisions of this invention.

Fig. 2 is an enlarged transverse sectional view substantially upon the plane of line II—II of Fig. 1, and Figs. 3 and 4 are sectional views similar to Fig. 2 but illustrating the use of a movable closure for the thermometer-inspection window.

Referring to the drawing for describing in detail the structures illustrated therein, and referring first to the structure illustated in Figs. 1 and 2, the reference character L indicates the main body or tube portion of the instrument. This is substantially uniformly cylindrical throughout and may be of any desired length suitable to its purpose of carrying the electrode terminal element G at one end and the conductor terminal cap H at its opposite end. It is formed of metal and thus constitutes a conductor between the terminal cap H and the electrode G.

The electrode G may be connected to the tube L in any appropriate manner but is shown here as having a threaded socket 1 within which the threaded end portion of the tube L engages, the fit being sufficiently tight so that the tube and the electrode are firmly connected after being once assembled. The electrode G may however be unscrewed and removed, and a differently shaped electrode substituted if desired at any time.

The terminal cap H at the outer end of the tube L is preferably connected by being threaded onto said end, as at 2. It is readily removable from the tube whenever occasion requires.

The electrode G has a central bore 3 continuing beyond the end of the socket 1 in axial alignment with the tube L adapted to contain a bulb portion 4 of the thermometer A. The main bulk of the thermometer is contained within the tube L, the bulb portion continuing into the bore 3, substantially as illustrated.

The exterior size, shape and proportion of the electrode G will vary in different instruments being of course dictated by the different specific uses to which different instruments may be put in practice. Preferably however the shape is arranged with respect to the bore 3 so that an opening as 5 is provided through one surface as 6 thus to enable a portion of the bulb 4 of the thermometer to be presented at, and preferably to protrude slightly from, said opening, in this way enabling the bulb 4 to come into direct surface contact with the organ or tissue being treated by the instrument during use of the instrument.

The terminal cap H consists of a metallic liner 7 and a hard rubber, or other insulating compound, jacket 8, the liner making metal to metal contact with the tube L through the threads 2, and providing a metallic socket portion 9 of a suitable type to receive and make good electrical connection with a terminal piece 10 of the conductor 11, the terminal piece being insertible into and removable from the socket 9 at will and being frictionally retained against accidental displacement while within said socket.

The tube L covers the entire length of the thermometer so that no portion of the thermometer projects beyond the outer end of the tube, the whole of the thermometer, when in use, being thus enveloped and protected against injury or displacement at this time.

Any suitable means may be provided for holding the thermometer against movement in all directions within its containing pocket. For this purpose the drawing illustrates the use of a soft rubber plug 12 which is inserted into the outer end portion of the tube L into engagement with the adjacent end of the thermometer, said plug being held pressed longitudinally against the end of the thermometer by having its outer end portion as 13 projecting beyond the tube L and engaged by a shoulder 14 of the cap H so that when the cap H is screwed home upon the tube L the plug 12 is squeezed against the thermometer.

The end surface of the plug which engages the thermometer is shaped, either normally, or as the result of the compressible elastic quality of the plug and its forced engagement with the thermometer, so as to provide a seat as 15 in the end of the plug within which the end of the thermometer engages, annular portions of the plug, as indicated at 16, extending relatively along the sides of the thermometer thereby holding the thermometer against lateral play.

The endwise pressure of the plug 12 against the thermometer holds the inner end of the thermometer bulb 4 against an end wall 17 of the bore 3, and this end wall 17 may be shaped so that it will, either of itself or in conjunction with a wall portion as 18 of the bore 3, operate to prevent both endwise and lateral movement of the adjacent portion of the thermometer. For instance the wall 17 may be inclined as indicated so that endwise pressure of the thermometer against said wall will operate to cam the thermometer toward and against the wall portion 18.

A suitable window opening as 19 is formed through the tube L at an appropriate location in the length of said tube for visual inspection of the scale portion N of the thermometer at all times. If desired this window opening may be sealed by a transparent closure 20, the desirability for said closure depending largely upon the use to which different instruments embodying this invention are to be put, it being for instance desirable if liquids are to be passed through the tube L.

The portion of the tube L between the electrode G and the cap H may be encased in a jacket 21, for instance of hard rubber or the like, which provides a pleasing exterior surface and at the same time serves as an insulating cover for the tube. The jacket 21 may be formed with a window opening 22 to mate the window 19.

It is noted that the diameter of the chamber provided within the tube L is sufficiently greater than the diameter of the thermometer so that an annular passage as 23 is provided between the outer surface of the thermometer and the inner surface of the tube and along which liquid may move lengthwise the instrument when desired. At the inner end of the instrument the bore 3 is of a diameter with respect to the bulb of the thermometer so that the passage 23 continues through said bore to the opening 5 so that liquid moving through the passage may pass through the opening 5 and thus directly to the tissue to be treated.

At the outer end of the instrument the socket opening 9 is shown to continue entirely through the length of the cap H, and the plug 12 is shown as having a central bore 24 communicating with said socket opening 9, and a notch as 25 is shown at the inner end of the plug to complete a passage-way for liquid from the socket opening 9 through said plug and into the annular passage 23 within the body L. Whenever it is desired to pass liquid through the instrument it is simply necessary to substitute a liquid conveying tube into the socket opening 9, in place of the conductor 11 and its terminal 10, and the liquid from said liquid conveying tube can move freely through the plug 12, along the annular passage 23 and out of the opening 5, or of course liquid may be moved in the opposite direction if desired.

In some instances it may be desired to attach both the electric conductor and the liquid conveying tube referred to. In this case the cap H can be formed with a side socket as 26 communicating with the socket opening 9, said socket openings 9 and 26 being selectively usable either by the electric conductor terminal or the liquid conveying tube. If either of these socket openings are unused at any given time it may be temporarily closed by a suitable closure as indicated at 27, said closure 27 being interchangeable to fit into and close either the main socket opening 9 or the side socket opening 26. Whenever it is desired to pass liquid through the instrument while at the same time supplying electricity thereto it is simply necessary to utilize both of the openings 9 and 26 one to receive the electrical conductor and the other to receive the liquid conveying tube.

The modification illustrated in Figs. 3 and 4 is the same in all respects as has already been described except that it suggests that the jacket 21 may be made rotatable about the outer surface of the main body or tube L thereby to move the window opening 22 of the jacket out of register with the window opening 19 of the tube L and in this way form a seal for the window opening 19 whenever a seal is desired, Fig. 3 illustrating the jacket 21 to be in a position having its window 22 in register with the window 19, and Fig. 4 illustrating said jacket to be rotated so as to dispose an unapertured portion as 28 of itself as a closure covering and sealing the window opening 19 of the tube L.

The transparent closure 20 may be present or not, as desired in connection with the modification Figs. 3 and 4.

The instrument thus described is simple, practical and substantial in structure. It may be used for numerous purposes as will suggest themselves to persons familiar with such instruments, and it may be made up in various forms for different purposes. It carries its thermometer in a position such that it will be highly sensitive to the temperature of the organ or tissue under treatment. Liquids passing through the instrument will so envelop the thermometer that the thermometer will quickly register the temperature of such liquids. There will be no possibility or necessity for displacement of the thermometer. The thermometer is made a substantially permanent element of the instrument entity. The thermometer is always safe against injury. It is kept suitably clean, and it is always readily readable, it may be removed for cleaning or other purposes, at the will of the user after first removing the cap H.

It is here noted that if desired the metallic tube L may be dispensed with in whole or in part, the tubular body for containing and protecting the thermometer being for instance in that case made up partly or wholly of non-conducting material and the required electrical conduit lengthwise the body to the electrode being a conductor of wire or other suitable form embedded in or carried by the body material.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. An instrument of the class described comprising a tubular metallic body having an electrode at one end thereof and a terminal cap at the other end, a thermometer carried within said tube with its bulb end portion at said electrode said tube said electrode and said cap constituting a protecting enclosure for substantially all of said thermometer, there being a laterally opening window in said enclosure through which to inspect a portion of the thermometer, and a resilient plug arranged within one end of the enclosure engaging between an end of the thermometer and the adjacent end wall of the enclosure resiliently urging the thermometer lengthwise against the opposite end wall of the enclosure thereby holding the thermometer against endwise movement in the enclosure.

2. An instrument of the class described comprising a tubular metallic body having an electrode at one end thereof and a terminal cap at the other end, a thermometer carried within said tube with its bulb end portion at said electrode said tube said electrode and said cap constituting a protecting enclosure for substantially all of said thermometer, there being a laterally opening window in said enclosure through which to inspect a portion of the thermometer, and a resilient plug arranged within one end of the enclosure engaging between an end of the thermometer and the adjacent end wall of the enclosure resiliently urging the thermometer lengthwise against the opposite end wall of the enclosure thereby holding the thermometer against endwise movement in the enclosure, said resilient plug having portions engaging relative side surfaces of the thermometer serving in holding the thermometer against lateral movement in said enclosure.

3. An instrument of the class described comprising a tubular metallic body having an electrode at one end thereof and a terminal cap at the other end, a thermometer carried within said tube with its bulb end portion at said electrode said tube said electrode and said cap constituting a protecting enclosure for substantially all of said thermometer, and there being a passage-way provided through said tube said cap and said electrode through which liquid may move to parts under treatment.

4. An instrument of the class described comprising a tubular metallic body having an electrode at one end thereof, a thermometer carried within said tube with its bulb end portion at said electrode said tube and said electrode constituting a protecting enclosure for all of said thermometer except that a small end portion of the thermometer protrudes through an opening in a surface of the electrode, and there being a passage-way provided lengthwise through the instrument about said thermometer and to said opening adapted for movement of liquids to said opening.

5. An instrument of the class described comprising a tubular metallic body having an electrode at one end thereof and a terminal cap at the other end, a thermometer carried within said tube with its bulb end portion at said electrode said tube said electrode and said cap constituting a protecting enclosure for substantially all of said thermometer, and there being a passage-way provided through said tube said cap and said electrode through which liquid may move to parts under treatment, said cap having one portion constructed for attachment of a conductor terminal into electrical connection with said body and having another portion constructed for attachment of a liquid conduit for supplying liquid into said passage-way.

MYRON J. DRACHMAN.